United States Patent
Newell et al.

[11] Patent Number: 5,918,248
[45] Date of Patent: Jun. 29, 1999

[54] SHARED MEMORY CONTROL ALGORITHM FOR MUTUAL EXCLUSION AND ROLLBACK

[75] Inventors: Terry Edwin Newell, Kanata; Brian Baker, Dunrobin, both of Canada

[73] Assignee: Northern Telecom Limited, Montreal, Canada

[21] Appl. No.: 08/774,548

[22] Filed: Dec. 30, 1996

[51] Int. Cl.[6] .................................................. G06F 12/00
[52] U.S. Cl. ........................ 711/147; 711/148; 711/154; 395/673; 395/704
[58] Field of Search .................... 711/148, 144, 711/154, 145, 147; 395/673, 704

[56] References Cited

U.S. PATENT DOCUMENTS

| | | | |
|---|---|---|---|
| 4,459,661 | 7/1984 | Kaneda et al. ............................ | 711/6 |
| 4,949,251 | 8/1990 | Griffin et al. ...................... | 395/182.18 |
| 4,965,718 | 10/1990 | George et al. ............................ | 395/674 |
| 5,210,844 | 5/1993 | Shimura et al. ......................... | 711/153 |
| 5,761,724 | 6/1998 | Jhon et al. ............................... | 711/144 |

FOREIGN PATENT DOCUMENTS 0 282 213  9/1988  European Pat. Off. .

OTHER PUBLICATIONS

"Sharing Memory Resources Across Applications in OS/2", *IBM Technical Disclosure Bulletin*, vol. 35, No. 1A, Jun. 1992.

*Primary Examiner*—Tod R. Swann
*Assistant Examiner*—Mehdi Namazi

[57] ABSTRACT

The invention provides a mechanism for allowing a share memory/parallel processing architecture to be used in place of a conventional uni-processing architecture without requiring code originally written for the conventional system to be rewritten. Exclusive Access and Shared Read Access implementations are provided. A rollback mechanism is provided which allows all the effects of a task to be undone.

23 Claims, 8 Drawing Sheets

| TIN STATE | FAST MEMORY (STATE BITS) | SLOW MEMORY |
|---|---|---|
| RUNNING | 0 0 | SID OF RUNNING TASK |
| RUNNING, OVERTIME | 0 1 | |
| COMMITTED | 1 0 | 0XXXXXXX |
| COMMITTED, OVERTIME | 1 0 | 1XXXXXXX |
| ROLLBACK | 1 1 | 0XXXXXXX |
| ROLLBACK, OVERTIME | 1 1 | 1XXXXXXX |

| OWNED | DIRTY | ACTIVE COPY | OWNER | MODE | SWITCH |
|---|---|---|---|---|---|

FIG.12

| ACTIVE | TIN | GENERATION |
|---|---|---|

FIG.13

SHARED MEMORY CONTROL ALGORITHM FOR MUTUAL EXCLUSION AND ROLLBACK

FIELD OF THE INVENTION

The invention relates to shared memory systems for use in parallel processing environments.

BACKGROUND OF THE INVENTION

Some processing systems have processing architectures which are based upon a single central control component which is responsible for all top level processing in the system. An example of this is the DMS (Digital Multiplexed Switch) switch architecture used by Northern Telecom in which the single central control component is a single core processor. When compared with parallel processing architectures, such non-distributed architectures provide the advantage to application programmers of some simplification in terms of resource control, flow control, and allowing memory communication rather than messaging between multiple processors. A potential problem with such an architecture is that serious bottlenecks may develop in the central control component mainly due to the single core processor, particularly as more features are added to applications running on the system.

One of the major problems in a multiprocessor system is in preventing data access collisions due to two or more processors accessing the same data at the same time. A data collision occurs when multiple processors interleave accesses to the same data structure such that an inconsistent state is read or updates are lost. For example, if one program makes multiple reads from a data structure while another program, executing concurrently with the first program, modifies the structure such that some reads are made before the structure is modified, and some after, this would result in an inconsistent state of the data structure being read. Typically in multiprocessor architectures, the software is specifically designed from the start with explicit knowledge of this condition in the system and is therefore designed in such a way as to avoid the problem. Mechanisms for doing this generally provide exclusive access to the memory subject to such collisions via software semaphore techniques, or bus lock techniques. These techniques prevent interleaving accesses to data, and require explicit software knowledge of the nature of collisions and specific mechanisms for avoiding them.

Correct operation of many conventional shared memory multiprocessor architectures requires measures to ensure cache coherency. If one or more processors have a copy of an item from shared memory and one of the processors modifies that item, then the modification must be propagated to the other processors. Cache coherency implementations typically require complex high speed protocols between processors and caches.

In systems where the processing capacity provided by a single processor architecture has been surpassed, a shift towards a parallel processing architecture may provide the required increased processing capacity, but it may not be feasible to rewrite the application code originally written for a single processor so that it will work on a parallel processor architecture, simply because of the immense cost incurred and time required to complete such a task.

In order to achieve the combined goal of using multiple processors with little or no modification to the software which was originally written for a single processor architecture, it is necessary that the protection from data access collisions normally provided by software protection techniques be automatically provided by the system.

SUMMARY OF THE INVENTION

It is an object of the invention to provide a parallel processor/shared memory architecture which obviates or mitigates one or more of the above identified disadvantages.

According to a first broad aspect, the invention provides a parallel processing/shared memory system comprising: a plurality of processors for running a plurality of tasks each identifiable by a task identifier; one or more memory modules each having a plurality of memory locations, each memory location associatable with one of the task identifiers; means for allowing or denying a particular task to access a particular memory location on the basis of the task identifier associated with that location and task identifier of the particular task, and for associating the task identifier of the particular task with the memory location when the particular task is allowed access to that location.

Preferably, the memory module has a tag field for each memory location and a data field for each memory location, the tag field including an ownership field for storing ownership information identifying the associated task, the associated task being the owner task for that memory location.

Preferably, upon a first read or write by a given task of a given unowned location, ownership information identifying that task is written into the ownership field of the location; a first write by a given task to a given location is achieved by changing the active copy field to point to what formerly was the rollback copy, and writing the new data to the newly defined active copy; and subsequent writes by the given task to the given location are achieved by writing to the active copy.

Preferably, memory locations include standard locations and shared read locations, and any task is allowed read access to a shared read location, but only a single task is allowed write access to a shared read location.

An advantage provided by the data ownership aspect of the invention is that a single processor architecture may be replaced with a multi-processor parallel processing architecture without requiring the application software to be rewritten to function properly.

An advantage of the multiprocessor/shared memory architecture according to this invention is that the cache coherency problem referred to above does not arise, because data ownership ensures that only one task and consequently, only one processor can own a data location.

An advantage of the rollback aspect of the invention is that an increased fault tolerance is provided.

BRIEF DESCRIPTION OF THE DRAWINGS

Preferred embodiments of the invention will now be described with reference to the attached drawings in which:

FIG. 12 is the record structure for the tag memory of FIG. 11 which includes fields for the Shared Read Access functionality; and FIG. 13 is the record structure for the SST memory of FIG. 11 which includes fields for the Shared Read Access functionality.

DETAILED DESCRIPTION OF THE PREFERRED EMBODIMENTS

Figure 1:
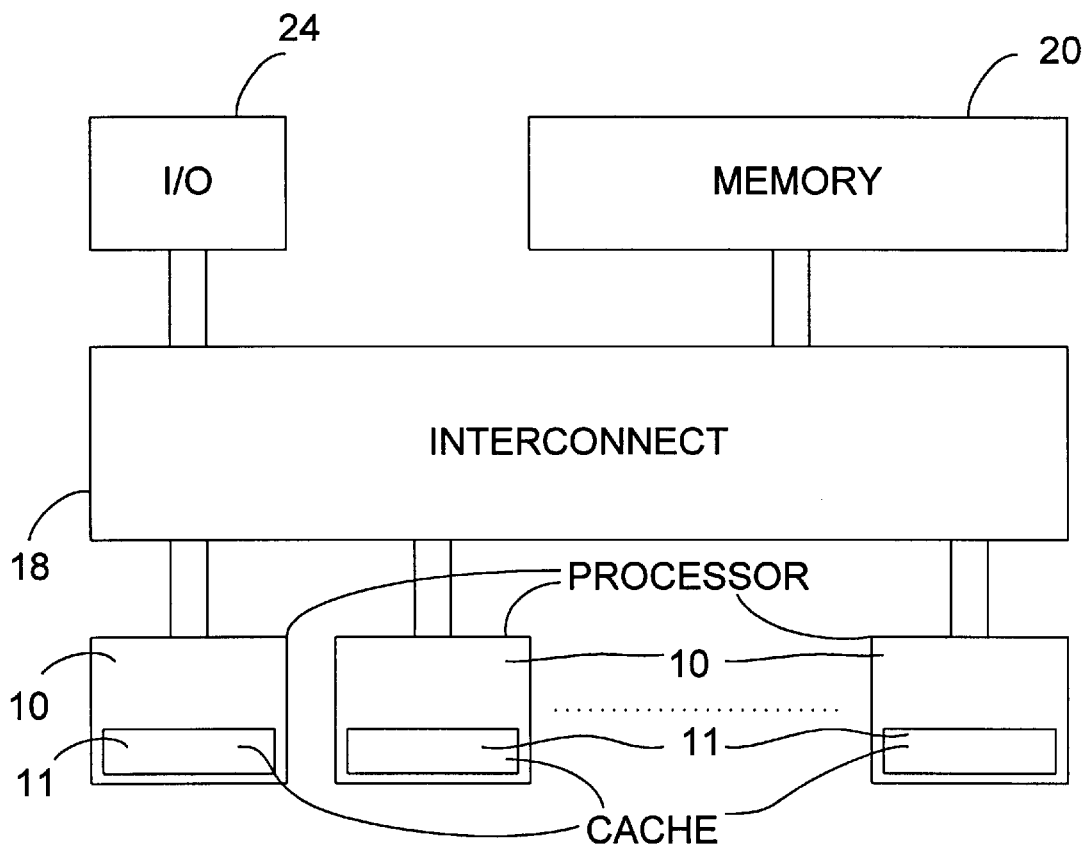
FIG. 1 is a block diagram of a shared memory/multiprocessor architecture.

Conventional uni-processor architectures allow only one process to be run at a time, although the logical behaviour of parallel operation can be achieved by running each of a number of processes in turn for a short period or burst of operation. An operating system controls the swapping in and out of the various processes. A time slice is a unit of time which generally corresponds to the permitted duration of a burst. A time slice may be lengthened by delaying the end of the time slice beyond the normal permitted duration, in appropriate cases.

The period of time (referred to above as a burst) that a process runs continuously is referred to as a task. A process is made up of an arbitrary number of tasks. Because one burst runs at a time, processing during a burst is atomic on conventional uni-processor architectures. During the burst, the task may make changes to shared memory or registers, but no other task can see the effects until the burst is completed. Although a task is atomic, this does not mean that a process is atomic; a long running process is split into tasks, and other processes run in the intervals between the tasks. These intervals occur at arbitrary points in the process that are controlled by the process, and more specifically by the tasks themselves, so it can be assumed that any given task forming part of a process will fall into a single burst and operate atomically.

Many processes may be event driven. An event is a stimulus from outside the process, such as a message from a peripheral or from another process. When an event occurs, the process is started, runs briefly, and then stops to wait for the next event. If it can be ensured that a given process run will complete within a single burst, then the event processing can be considered atomic.

Most processes cannot be completed in a single burst, but it is convenient to treat all processes alike. For this reason, any process is treated as a sequence of tasks. If the process can complete within a single burst, then the process is treated as a sequence of tasks of length one. As before, the individual tasks are atomic, but the process as a whole is not necessarily atomic. If a sequence of tasks making up a process needs to be atomic then the tasks must use software constructs such as semaphores to protect the data from interference by other processes.

In what follows, it is assumed that the task is the unit of atomic operation, and that processes are simply sequences of tasks. As such, no further references to processes will be made.

Two broad implementations of the invention will be described. One implementation is referred to as an "Exclusive Access" implementation, and the other implementation is referred to as a "Shared Read Access" implementation. In an Exclusive Access implementation, a particular task takes ownership of a memory location upon either a read or a write access, while in a Shared Read Access implementation, a particular task owns a memory location only upon a write access.

The first implementation to be described will be the Exclusive Access implementation. Referring now to FIG. 1, a parallel processor/shared memory architecture has a plurality of processors or processing elements 10 (only three of which are shown) connected through an interconnect 18 to a main shared memory consisting of one or more memory modules 20 (only one shown). One or more I/O devices 24 are also connected to the interconnect 18 (only one shown). It is common to equip systems with redundant hardware components to aid in fault tolerance, but these are not essential to the invention and are not shown. Each processor 10 has a respective cache memory 11 having a cache line size of 32bytes, for example. Each memory module 20 has a data memory and has memory ownership control functionality implemented with hardware. For ownership purposes, the data memory in each memory module 20 is divided up into segments of memory referred to as "lines" or "memory locations" each of which is preferably 32 bytes in size, the same size as a cache line. In addition, for each 32 byte data location, the data memory has another 32 bytes of memory for storing a second copy of the data. The two copies of the data will be referred to as "Copy A" and "Copy B". For brevity, a multi-processor/parallel processing architecture such as that illustrated in FIG. 1 will be referred to as an "MPA" (multi-processor architecture) while a uni-processor architecture will be referred to as a "UPA" (uni-processor architecture).

The shared memory 20 of an MPA according to the invention logically corresponds to the memory of a conventional UPA. Each processor 10 in an MPA can run a separate task. The task operates on one of the processors 10, taking data as required from the shared memory 20. The processors 10 will maintain copies of the data in their respective cache memories 11, eventually flushing all their results to the shared memory 20. This allows several tasks to proceed in parallel. An OS (operating system) runs on the processors 10 and controls on which processor a given task is to be run. An OS designed for a UPA may be changed to manage tasks in this parallel manner, with little or no change to the application code originally written for a UPA. Each task running on one of the processors 10 is identified by a unique SID (slot identification number). There must be sufficient unique SIDs to ensure that a processor can be allocated one when required. If each processor can run N tasks simultaneously (this is also referred to as each processor having N "slots") and there are M processors, then there must be at least N×M unique SIDs. For this description of the preferred embodiment, it is assumed that there are 16 processors, each of which may require up to 16 SIDs, meaning that there is a requirement for 256 unique SIDs.

Figure 2:
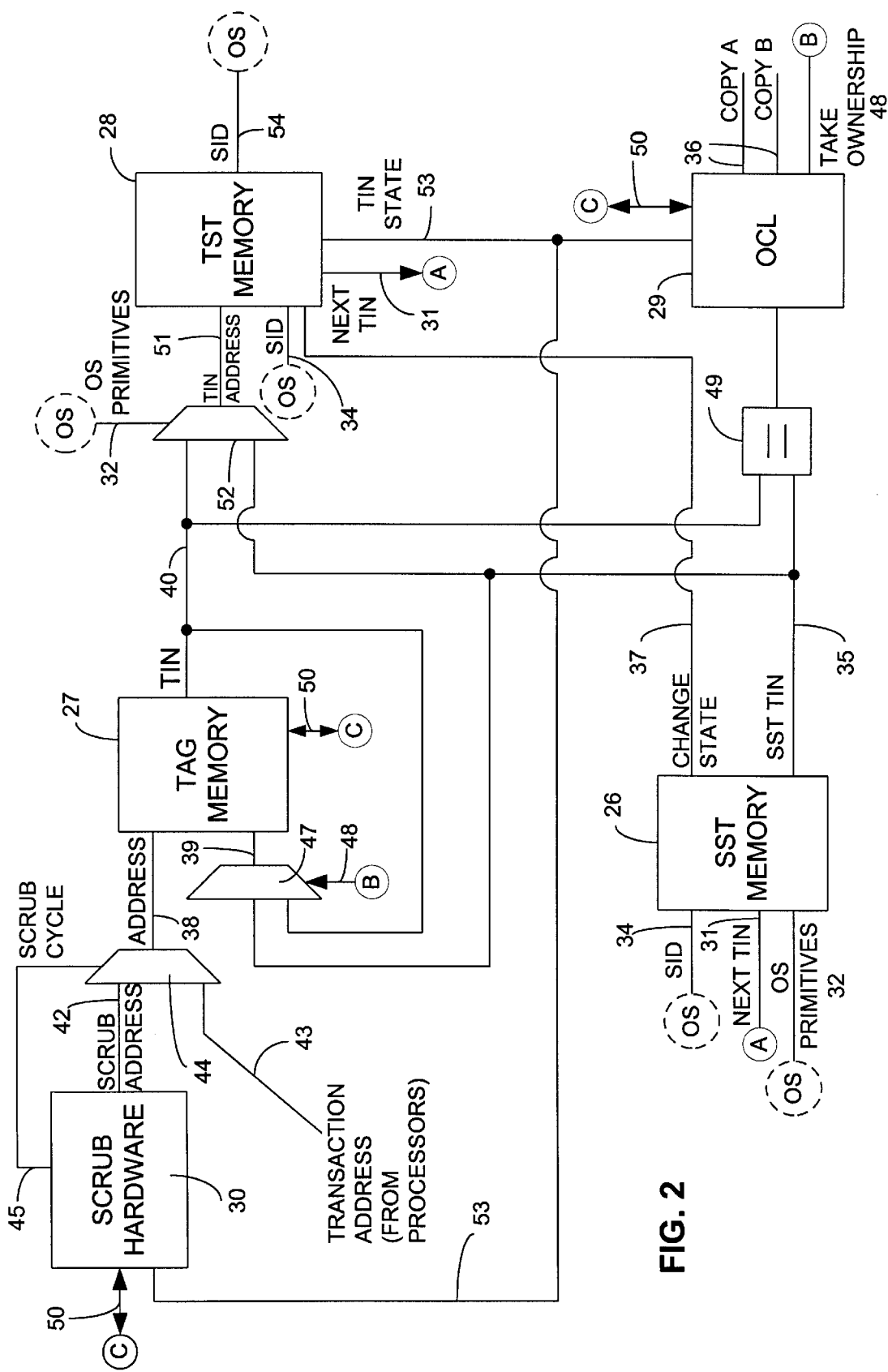
FIG. 2 is a block diagram of the memory ownership control system according to the invention for an Exclusive Access implementation.

Special arrangements must be made to ensure that tasks on the MPA will operate as if they are atomic. More precisely, results from an MPA task must not be affected by the presence of other tasks running at the same time. FIG. 2 is a block diagram of the memory ownership control hardware which forms part of the shared memory 20. The memory ownership control hardware together with the operating system running on the processors controls whether a given task running on one of the processors will be allowed to continue after attempting to access a particular memory location in the shared main memory. It is noted that the majority of functions required to control memory ownership are implemented in the memory ownership control hardware forming part of the memory modules without the involvement of the operating system. The operating system may get involved in cases in which contention for access to a particular memory location occurs, as described in detail below.

The memory ownership control hardware includes three memories, namely a SST (slot state) memory 26, a tag memory 27, and a TST (TIN state) memory 28. In addition to the three memories 26,27,28, the hardware also includes ownership control logic which performs the actual control over access to and ownership of the data locations. Some of the control logic is shown explicitly in FIG. 2, and some of it is lumped together into blocks 29 and 30 entitled the OCL (ownership control logic) and the scrub hardware respectively.

The operating system controlling the processors 10 of FIG. 1 is shown in various locations in FIG. 2 in dotted circles labelled OS, but the OS does not form part of the memory ownership control hardware. The memory ownership control hardware forming part of the memory module communicates with the OS through the interconnect 18 (FIG. 1). It is to be understood that FIG. 2 is a functional block diagram, and that an efficient implementation would combine all of the logic shown into a minimal number of chips, preferably only one. Thus, while many connecting lines are shown, in many cases these simply represent information flow between functional blocks, and not actual physical connections between discrete components. Furthermore, not all information flows are represented explicitly by lines in FIG. 2.

The SST memory 26 contains 256 records, one for each possible SID. Each time a task having a SID is started, it is allocated a TIN (task identification number) in each memory module. When the task is finished, the SID is immediately available for identifying another task. However, the TIN is not made available to another task until all the effects of running the task have propagated throughout the memory modules and the memory control system, as discussed in detail below. The tag memory 27 contains a tag record for each line of memory in the memory module, and contains ownership information for that line. The ownership information includes the TIN of the task which owns that line of memory. The TST memory 28 contains state information for each TIN. Each of these memories will be discussed in detail below.

Inputs to the SST memory 26 include a next available TIN 31, OS primitives 32, and a SID input 34 for inputting the SID of the accessing task. Outputs from the SST memory 26 include a SST TIN output 35, and a TIN state change command 37. It is noted that various different OS primitives may be generated by the OS, and that various blocks in the memory ownership control hardware will be effected by these OS primitives. Collectively,.they are shown in the block diagram as OS primitives 32.

Figure 3:
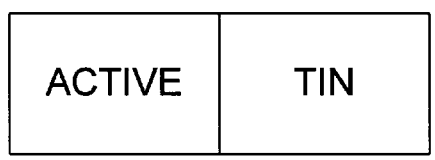
FIG. 3 is the record structure for the SST (slot state) memory of FIG. 2.

The structure of each record in the SST memory 26 is shown in FIG. 3. Each record includes an "Active" field, and a "TIN" field. The active field is "0" if the slot does not have a task running in it, and contains a "1" if the slot does have a task running in it. The TIN field contains the TIN currently assigned to this slot. When the OS starts a task on a given processor, the OS allocates the next available SID for that processor. It also instructs the SST memory 26 in each memory module 20 through a "task launch" OS primitive 32 to allocate the next available TIN 31 for that SID, and the Active field in the SST memory record for that SID is set. The next available TIN 31 is received from the TST memory 28 and recorded in the TIN field in the SST memory record for that SID. The "task launch" is a broadcast type command in the sense that it is not memory module specific.

Figure 4:
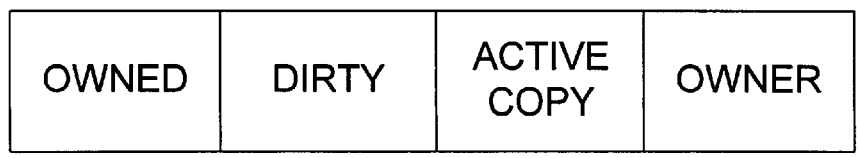
FIG. 4 is the record structure for the tag memory of FIG. 2.

Inputs to the tag memory 27 include a memory location address input 38, and an owner TIN input 39. Outputs of the tag memory 27 include an owner TIN output 40 together with the other fields contained in the tag memory record for the memory location addressed by the address 38 presently being input to the tag memory 27. These other fields are discussed below. The address input 38 may come from either a scrub address input 42 generated by the scrub hardware 30, or a transaction address input 43 which is received from a processor running the relevant task. A multiplexer 44 is used to select either the scrub address 42 or the transaction address 43 for use as the address input 38. The transaction address 43 is used unless a scrub cycle signal 45 generated by the scrub hardware 30 indicates otherwise. The owner TIN input 39 is connected through a multiplexer 47 to receive a TIN from either the SST TIN output 35 or the owner TIN output 40. The multiplexer 47 has an input 48 from the OCL 29 for receiving a "take ownership" command which indicates that the SST TIN 35 is to be written into the owner TIN field (discussed below) of the currently addressed tag record. The SST TIN 35 is also used when checking state information stored in the tag memory for a given TIN. If there is no TIN 35 and no take ownership command 48, then the input to the owner TIN field is the same as the output TIN 40 so no change occurs. The TIN output 40 and the SST TIN output 35 are fed to a comparator 49. The structure of each record in the tag memory 27 is shown in FIG. 4. Each record includes an "Owned" field, a "Dirty" field, an "Active Copy" field, and an "Owner" field. The Owned field is "0" if the line is not owned, and is "1" if the line is owned. The Dirty field is "0" if the line has not been written by the current owner, and is "1" if it has been written by the current owner. The Active Copy field is "0" if Copy A is the currently active copy of the corresponding line of memory, and is "1" if Copy B is the currently active copy of the corresponding line of memory. The Owner field contains the TIN of the owner task. The contents of the tag memory for the TIN address 38 currently being input are generally indicated by reference numeral 50 in FIG. 2 and are available for both read and write access by the OCL 29 and the scrub hardware 30.

Figures 5, 6:
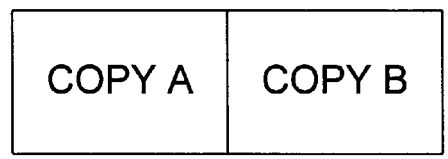
FIG. 5 is the record structure for the TST (TIN state) memory of FIG. 2.
FIG. 6 is the record structure for the data fields in a memory location.

Inputs to the TST memory 28 include a TIN address input 51, the TIN change state commands 37 generated by the SST memory 26, and the SID 34 received from the OS. A multiplexer 52 is connected to pass a TIN address 51 from either the SST TIN output 35 from the SST memory 26, or the TIN output 40 from the tag memory 27. The multiplexer 52 selects the TIN 40 from the tag memory 27 unless an OS primitive 32 indicates otherwise. Outputs of the TST memory 28 include a TIN state output 53, a SID output 54, and the next available TIN 31. When the "task launch" primitive 32 is generated by the OS, the SST memory 26 takes the next available TIN 31 and assigns it to the new SID. At the same time, to ensure that a next available TIN is always available, the TST memory 28 looks for the next TIN which is not in use, and sets this to be the next available TIN 31. The TST memory 28 contains a record for each TIN which indicates the state of that TIN, this being either "Running", "Committed" or "Rollback". In addition to being in one of the three states Running, Committed, or Rollback, each task may also be in a supplementary state referred to as "BUSY", and this state is used to control TIN reallocation as described in detail below. The structure and contents of each record in the TST memory 28 is shown in FIG. 5. Each record has two bits stored in fast static RAM and has 8 bits stored in slow static RAM. The fast memory bits "0 0" indicate the state Running, and the fast memory bits "0 1" indicate the Running,BUSY. For either of these cases, the slow memory contains the SID of the running task. The fast memory bits "1 0" indicate Committed, with the BUSY state being indicated by the first bit of slow memory being a "1". The fast memory bits "1 1" indicate Rollback, with the BUSY state being indicated by the first bit of slow memory being a "1". The bit indicating BUSY, this being the second fast memory bit or the first slow memory bit, is referred to as the BUSY bit. When the TST memory 28 receives a TIN address 51, it updates the state as indicated by a change state command 37 if such a command exists, or otherwise outputs to the OCL 29 the state of the corresponding TIN as TIN state 53. The TIN state is set to "Running" when the task launch primitive 32 is received from the OS. In that case, the SID 34 of the task is written to the slow memory field. When the task completes normally, the OS will send the OS primitive 32 "Commit" to the SST memory 26. The SST looks up the corresponding TIN and outputs this as SST TIN 35, and instructs the appropriate record in the TST memory 28 to change to the commit state by sending the Commit change state command 37. Similarly, when a task must be rolled back, the OS will send the OS primitive 32 "Rollback" to the SST memory 26. In this case, the SST memory 26 sends a rollback change state command 37 to the TST memory 28 to change the state of the appropriate record accordingly. Both the "commit" and "rollback" primitives are broadcast simultaneously to all the memory modules.

The record structure for an actual memory location is shown in FIG. 6. There are two copies of a data field, namely Copy A and Copy B. It is noted that the tag memory 32 and the data memory may be combined by storing the tag for a given location together with the actual data. The OCL 29 controls which copy is returned to an accessing task by Copy A and Copy B select signals 36.

Figure 7:
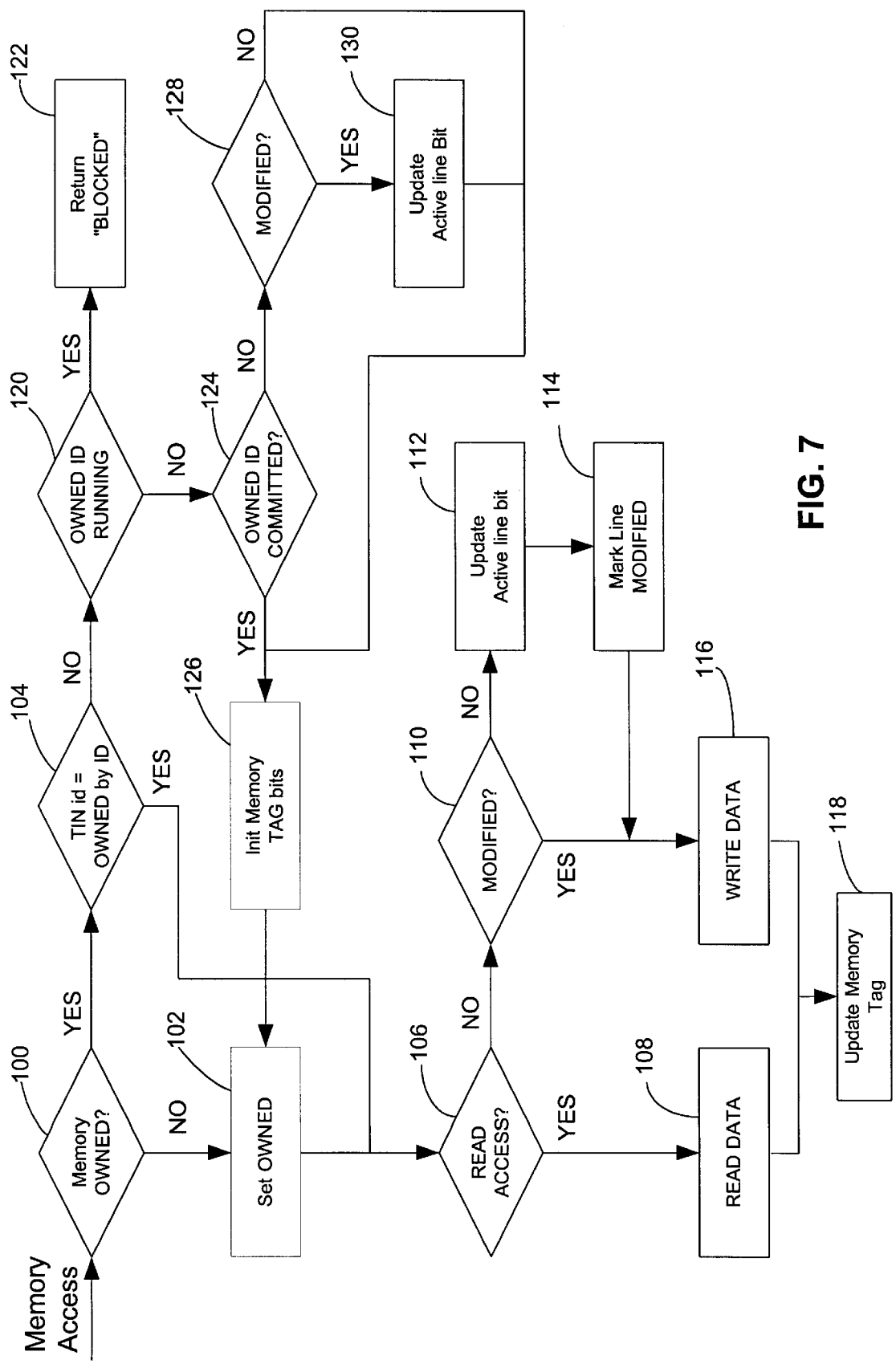
FIG. 7 is a flowchart of the steps executed by the shared memory/multi-processor architecture during a memory access.

The procedure for controlling access to a memory location will now be described with reference to the flowchart in FIG. 7, and to the previously described FIGS. 1–6. Block numbers refer to the flowchart in FIG. 7. When a task having a particular SID attempts to access a particular location, the relevant processor passes the memory address as input 38 to the tag memory 27. The tag memory 27 outputs the TIN (if any) stored in the tag for that memory address as TIN output 40. The OS also passes the SID 34 of the accessing task to the SST memory 26 which looks up the corresponding TIN if any, and produces this as the SST TIN output 35. A check is made of the Owned field in the corresponding record in the tag memory (block 100). If the Owned field indicates that the location is unowned, then the task is allowed access to the location, and the Owned field is set to indicate that it is owned (block 102). If the owned field indicates that the location is owned, then a comparison between the TIN of the accessing task and the task which owns the location is made (block 104). This amounts to the comparator 49 comparing the TINs on the two TIN outputs 35,40. The OCL 29 receives the comparator 49 output. If these are the same (yes path, block 104), then the task is allowed access. If it is a read access (yes path,block 106) then the location is read (block 108) and the contents passed to the accessing task. If it is a write access (no path, block 106) a check is made to determine if the location was previously modified (block 110) by checking the Dirty field in the tag. If it was not previously modified (no path, block 110), then the Active Copy field is flipped (block 112). In other words, if the Active Copy field previously indicated Copy A (Copy B) as the active copy, then it is flipped to indicate Copy B (Copy A) as the active copy, thereby preserving the contents of Copy A (Copy B). This amounts to toggling the bit in the Active Copy field. After this, the Dirty field will be set to indicate that the location has been modified (block 114). After this, (or if the location had been previously modified, yes path—block 110) the task is allowed write access to the location, and the new data is written to the active copy (block 116). The tag memory 27 is then updated by writing the TIN of the accessing task to the Owner field if necessary (block 118).

If the accessing TIN 35 and the owner TIN 40 are not the same, (no path, block 104), then a check of the state of the owner TIN is made in the TST memory 27 (block 120). The owner TIN 40 is passed to the TST memory 28 through multiplexer 52, and the TST memory looks up the state for that TIN. If the state of the owner TIN is "Active" (yes path, block 120) then the task is denied access, and a "Blocked" state signal 53 is returned (block 122). If the state of the owner TIN is not "Active" (no path, block 120) then a check is made to see if the state is "Committed" (block 124). If it is committed (yes path, block 124), then the tag field is initialized (block 126) by clearing the Dirty flag. The task is then allowed access as before, continuing from block 102.

If the state is not "committed" (no path, block 124) then the state must be "rollback". A check is made to determine whether the particular location was modified by the task which previously owned it (block 128). This is done by checking the Dirty flag in the relevant tag record. If the location was not modified (no path, block 128), then the task is allowed access as before, continuing from block 126. If the location was modified (yes path, block 128), then the active copy field is flipped to point to the copy of the memory location which was not modified by the task which previously owned it (block 130). This amounts to toggling the Active copy field. After this, access is permitted as before, continuing from block 126.

When a task is allowed access to a particular location, the OCL 36 generates a take ownership command 48 which causes the TIN of the new owner to be written into the tag memory 27 for that location.

Figure 8:
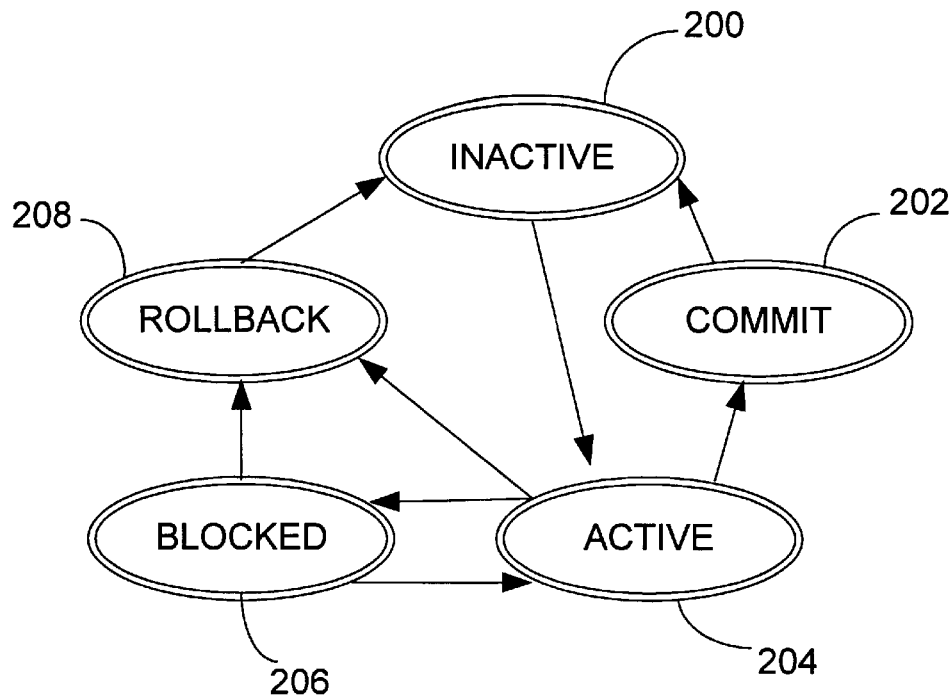
FIG. 8 is a state diagram for the TIN state machine.
Figure 9:
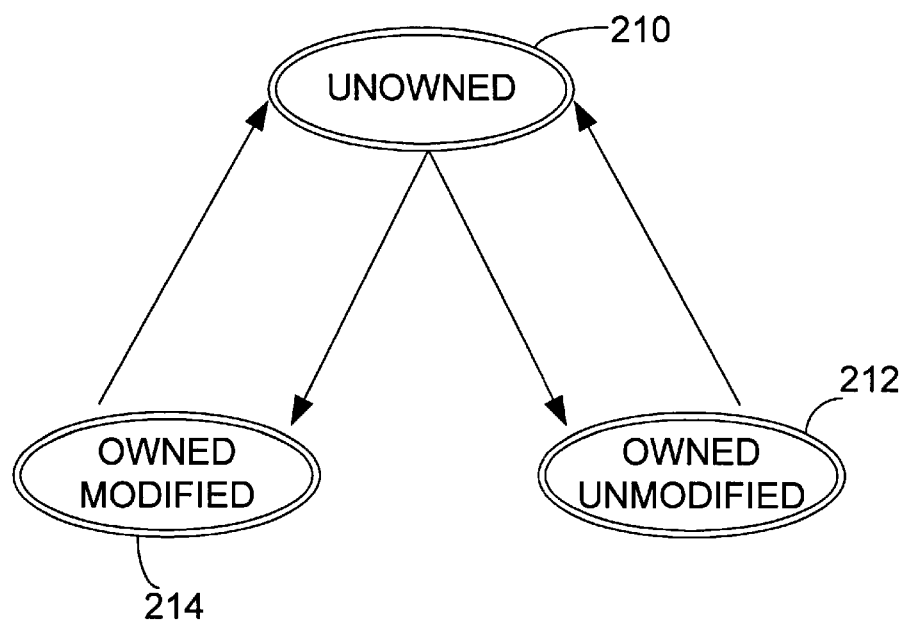
FIG. 9 is a state diagram for the memory state machine.

The state transitions which occur for each TIN can be modelled with a state machine, as depicted in FIG. 8. Similarly, the state transitions which occur for each memory location can be modelled with a state machine as depicted in FIG. 9. Initially, each TIN is INACTIVE (bubble 200) since there is no task associated with it, and each memory location is in an UNOWNED state (bubble 210), or is owned by another task. When a new task starts, the "task launch" primitive 32 instructs the SST memory 26 to assign the next available TIN to the SID of the new task. The TIN is written into the SST memory 26 for that SID. At the same time, the SID is written into the TST memory 28 for the newly assigned TIN. The Active field in the SID record then changes from INACTIVE to ACTIVE, and the state bits in the TIN record in the TST memory are changed to indicate Running. At this point the TIN state transition INACTIVE (bubble 200) →ACTIVE (bubble 202) has occurred. No other state changes from the INACTIVE state are possible as can be seen in FIG. 8.

Upon a first access to a memory location after the "task launch", the tag for the memory location is updated by writing the TIN of the accessing task into the owner field, and by setting true the Owned field. If a write access occurs, then the Dirty flag is also set true. At this point for a read access the memory state transition UNOWNED (bubble 210)→OWNED, UNMODIFIED (bubble 212) has occurred, and for a write access the memory state transition UNOWNED (bubble 210)→OWNED, MODIFIED (bubble 214) has occurred. If a write access by the owner TIN to a memory location in the OWNED, UNMODIFIED state is executed, then the state transition OWNED, UNMODIFIED (bubble 212)→OWNED, MODIFIED (bubble 214) occurs.

A TIN which is ACTIVE (bubble 204) can undergo a state change to either COMMIT (bubble 202), BLOCKED (bubble 206) or ROLLBACK (bubble 208). When a task completes normally, the SST memory 26 is notified of this fact by a "Commit" primitive 32. This frees the SID of the completed task for reuse. At the same time, the "Commit" state change command 37 is also passed to the TST memory. The state bits in the TIN record are changed to indicate the COMMIT state (bubble 202).

Blocking will occur when a task attempts to access a memory location which is owned by another task. In this case, the task temporarily enters the state BLOCKED (bubble 206). The SID of the blocking task (the owner of the location) is output by the TST memory 28 as SID output 54. The OS receives the SID of the blocked task, and the SID of the blocking task and determines which SID is to be allowed to continue. If the blocked task is allowed to continue, then a state transition back to ACTIVE (bubble 204) for that task occurs, and the blocking task undergoes a state transition from ACTIVE (bubble 204) to ROLLBACK (bubble 208). Similarly, if the blocking task is to be allowed to continue, then the blocked task undergoes a state transition from BLOCKED (bubble 206) to ROLLBACK (bubble 208), and no state transition occurs for the blocking task which remains in the ACTIVE state. New state information is written to the state bits of the TIN records in the TST memory 28.

As described above, a state variable is maintained for each TIN and the tag for each memory location which is owned contains the owner TIN. When the state of a TIN changes, the state information for the TIN is updated in the TST memory 28. This is more efficient than updating state information for each memory location when a state change occurs. The tag information for each actual location can be updated or cleared later.

There are two ways for a memory location which has a TIN in a ROLLBACK or COMMIT state to be cleared. In the first, an accessing task attempts to access the location, and the memory location is cleared as discussed below. In the second, a scrub process running in the background and controlled by the scrub hardware 30 performs the clear function, as discussed below.

When an accessing task attempts to access a location which is owned by a TIN in either the ROLLBACK state or the COMMIT state, the accessing task is allowed access. In the ROLLBACK case, if the Dirty bit in the tag for that location was set, then the Active copy field is toggled thereby providing the accessing task access to the rollback copy of the data. The Dirty flag is cleared in all cases. Then the accessing task is allowed access.

The scrub process is a background process executed under control of the scrub hardware 30 which "scrubs" owned memory locations which have owner tasks in either the COMMIT or ROLLBACK state. The scrub process, which is described in detail below, examines each tag record 50 in the tag memory 27 in sequence for records which have an owned field which is set indicating the memory location is owned by a task. It does this by sequentially inputting scrub addresses 42, and sending scrub cycle signals 45. It looks up the state of the owning task in the TST memory 27 in the tag record 50 for the scrub address. If the owner task is in the ACTIVE state then no change is made. If the owner task was in the COMMIT state, then the scrub process clears the Owned field and the Dirty field. If the owner task was in the ROLLBACK state, then the scrub process first toggles the Active Copy field if the Dirty flag was set. Then the scrub process clears the Owned field, and the Dirty field. A memory location state transition from OWNED, MODIFIED to UNOWNED, or from OWNED, UNMODIFIED to UNOWNED occurs at this time. After all the memory locations owned by a given TIN are scrubbed, the state of the TIN is reset to INACTIVE (bubble 200), and is ready to be reallocated to another SID.

As mentioned previously, the "BUSY" bit (the bold bits in FIG. 5) is used to control TIN reallocation. TINs are allocated by each memory module sequentially from a large table. When a task having a particular TIN is completed, or is rolled back, the state in the TST memory 28 is updated to reflect this, but the individual tags in the tag memory 27 will not be updated until they are either visited by the scrub process, or are accessed by another task.

The allocation of TINs, and how it is ensured that all references have been removed before an attempt is made to reallocate the TIN will now be described. Various mechanisms might he devised; the one described herein is robust and effective, and is simple to implement in hardware. The mechanism relies on two assumed properties of tasks. First, a task must normally commit or rollback within some fixed time allocation. Second, there is a certain minimum overhead necessary to schedule and run a task so there is a maximum rate at which new tasks can be allocated. A few exceptional tasks may remain in existence for a long time, notably tasks which have been temporarily stopped to allow maintenance or diagnostics to be performed, but the number of exceptions is small and is limited by the number of slots available.

A task starts, and is allocated a TIN at time T. At time $T+t_A$, the task is checked by the scrub hardware 30 to see if it is still running: $t_A$ is chosen so that most tasks commit or rollback before reaching $T+t_A$. Assume that it takes a time $t_B$, to complete a scrub cycle. In other words, every tag will be updated within a time interval of length $t_B$. Therefore at time $T+t_A+t_B$, the scrub process will have completed a cycle, so if the TIN was not running at time $T+t_A$ it is ready to be reallocated at time $T+t_A+t_B$. It also takes a time $t_C$ to cycle through the TIN table and return to the same TIN. The time $t_C$ is a function of the frequency with which new tasks are started as detailed below, and of the size of the TIN table. If the task was not running at time $T+t_A$, it can certainly be reallocated on the next cycle at time $T+t_C$ since $t_C>t_B+t_A$.

On the other hand, if the task was still running at time $T+t_A$, it might not be completely scrubbed in time for the next cycle. In this case, the TIN is marked BUSY by setting the corresponding BUSY bit in the TST memory 28 at time $T+t_A$. At time $T+t_C$, the task is due to be reallocated, but because it is marked BUSY this reallocation is skipped and the next available TIN is allocated. The old task may or may not still be running at this time, but is treated just like a newly started task. After a further time $t_A$ the task is checked again, and has another chance to be found not running and to become available for reallocation. In the general case, a task starts at time T, is checked at times $T+kt_C+t_A$ until it is found not running, and is eventually reallocated at the next $T+kt_C+t_A$ after that.

It is preferred that rather than measuring or timing directly all the time intervals $t_A, t_B, t_C$, time is measured in terms of the numbers of tasks started. Assume initially that new tasks are started at regular intervals V and that the TIN table has N entries. All task allocation arithmetic is performed modulo N, and wraps around at the end of the TIN Table.

Consider task N which started at some known time. Some time later, task number N+X is started. By this time, task N has been running for a period of at least X×V. For properly chosen X, therefore, task number N should have either committed or rolled back before task number N+X is allocated. The state of task number N is examined when task number N+X is allocated; if N is still running, its BUSY bit is set, otherwise its BUSY bit is reset.

Still later, task number N+X+Y is allocated. By this time, a further period Y×V has elapsed. For properly chosen Y, this interval is sufficient for the scrub process to complete one pass through the memory, so during the interval every possible reference to task N has been visited by the scrub process. If N was not running at the start of the interval, all references to N have now been resolved. In other words, if the BUSY bit task N is not set at the beginning of the period Y×V then task N becomes available for reallocation at the end of that period.

It only remains to ensure that the size of the TIN table is greater than X+Y, so that a task N becomes available as described before the allocation wraps around.

The critical point needed to ensure correct operation of this mechanism is that the scrub process must complete a full scan of the memory, within the time (Y×V). This is easily arranged. The interval V determines the maximum sustained rate of task creation. If the scrub process visits a fixed number of locations in every interval V, and the total number of locations to be visited is also fixed, the time for a full scrub cycle is a known multiple of V, and it is merely necessary that the constant Y should exceed this known multiple.

For practical use, the mechanism must allow tasks to start at somewhat irregular intervals. A leaky bucket mechanism is used. This enforces a maximum sustainable task allocation rate of one task every time V, but allows up to K tasks to be started in advance of the times so defined. Conversely, task starts may be delayed, but the opportunity so lost cannot be regained.

More exactly consider a buffer which can hold up to K tokens. A token is added to the buffer every time V unless the buffer is already full. A token is removed from the buffer whenever a task is started or a busy task is skipped. If the buffer is empty task allocation must wait until a new token becomes available.

The TIN table must provide space for an extra K tasks. This merely requires that the size of the TIN table should be greater than X+Y+K.

Data ownership provides a running task with exclusive access to its data for the duration of the task, so that the task will operate on all data atomically. It is noted that, in general, it does not permanently associate data with a process or a subsystem or ensure that object data structures are accessible only through the correct methods. Long term data protection and making tasks atomic are quite separate concepts, although there are some apparent similarities.

It is possible for a task to fail to commit. This can occur as a result of a hardware or software failure. More commonly, it occurs when two or more tasks compete for ownership of a location when there is said to be a collision. The MPA must be able to escape from all such situations. The invention provides a rollback mechanism to permit such escape. Data ownership keeps a record of all changes made by a task. If rollback is required, data ownership reverses all the changes and restores the effected data to its initial state as if the task had not been run.

The rollback capability provides a very powerful mechanism for fault recovery. Each processor is equipped with local fault detection. The processors and memory paths within the processors are duplicated and cross checked so that failures are detected early, certainly before a task is allowed to commit. If a failure is detected, the task concerned is rolled back. This means that any task which completes and is allowed to commit has been correctly performed and validated by the fault detection hardware.

This fault recovery process has several advantages. If there is a fault, it is not necessary to determine which of a pair of matched processors has failed, and then accept the result from the other. Instead, the whole processor can be taken out of service, and the failed task can he restarted on another processor. MPA allows a processor to run in isolation from the active system, so that extensive diagnostics can be performed on the suspect processor before returning it to service or sending it for repair.

Typically, the OS controlling the MPA maintains a list of tasks which are ready to run. When processing resources become available, the OS selects a task from the list, and starts the task running on a processor. A task normally runs until it completes its work, or until it exhausts the time allocation permitted by the OS. At this point, control returns to the OS. If the task completes its work it returns control to the OS; if the time allocation is exhausted then a timer interrupt forces a return to OS.

Control will return to the OS from a task, in one of four ways:

1. When the task completes its work and calls the OS primitive "Commit";

2. When a timer interrupt generated by the OS forces the task to submit, even though it may not have completed; Note that certain sections of the code running during a task may be set to be unpreemptable. Such sections are at least temporarily immune to timer interrupts;

3. If the task tries to access a location which is currently owned by another task. This is called a "collision";

4. If there is a software exception or a hardware fault.

When control returns to the OS, the OS kernel calls on data ownership mechanisms to commit or rollback the task, updates its lists of tasks to be run, and schedules a new task. In some circumstances the OS may retain a partially completed task in a suspended state and continue it later. A suspended task is also said to be "blocked".

Normally, the OS runs one task at a time on each processor, and the task either runs to completion and commits, or it suffers a failure or collision and is rolled back. As indicated previously, the OS may suspend or block a task in which case it saves the task context, and runs another task on the processor.

When a task on a processor is forced to block, the registers and data used by the task are saved and the cache is flushed. The processor may then be used for other tasks. Eventually, the saved context is restored, and the blocked task can continue; otherwise the task can be rolled back. In a preferred implementation, that the blocked task continues on the same processor and slot; it cannot migrate to a different processor.

It is possible for a set of blocked tasks to deadlock, so that every task in the set must wait for another task in the set to unblock first. The OS keeps track of blocked tasks, and resolves deadlocks by rolling back one or more of the tasks involved. It is not desirable to have a large number of blocked tasks in the system. Tasks normally run for a short time before releasing ownership. If a task is blocked, it will retain ownership of any data which it has already accessed, so if too many tasks are blocked then there will be a large amount of inaccessible data, possibly increasing the number of collisions. Because of this, it is preferred that the OS block tasks in some exceptional circumstances but to more commonly rely on rollback.

As stated earlier, the effects of a task are not made visible to other tasks until the task commits. The overall effect is that tasks appear to operate atomically, but the order in which these atomic operations happen is the order in which the tasks commit, and the commit order is not necessarily the same as the order in which the tasks started.

The OS does not specify the order in which it will start tasks, even in conventional UPA architectures. The OS scheduler takes tasks from a pool of tasks which are ready to run, in an order controlled by relative priorities, system load, fair shares scheduling, and other parameters, and the total ordering is not predictable at the application level.

Order is preserved when there is a causal relationship between tasks. In such cases, the OS waits for a task to commit before starting a task which must follow it. For example, if a process P1 has an ongoing existence, but is run as a sequence of tasks T1, T2, T3, etc., then these tasks must run one at a time in order and the OS must not start one of them until its predecessor has finished. Similar rules apply to messages; if process P1 sends an ordered series of messages to process P2 then it will receive and process those messages in the same order.

Note that if processes P2 and P3 are independent, no order is implied between them. If P1 sends a message to P2 and later sends a message to P3, either P2 or P3 may run first. Likewise, if P2 and P3 now send messages to P4, either message may arrive first.

Although the OS does not specify the order in which independent tasks are performed, a poorly designed application could perhaps exploit some unspecified aspect of the OS scheduler behaviour. Such an application could happen to work on a conventional UPA, but fail to work under the MPA implementation. Such applications should be rare in most systems and are to be avoided. Note however, that the systems provided by the invention may be extended to include features such as in-order commits such that the above described situations could still be handled, but this will have a negative effect upon performance.

Each processor uses its cache to hold copies of locations which are in use by that processor. The data ownership provided by the invention prevents a copy of a location from being held in more than one cache. This avoids the problem encountered in conventional parallel processing architectures of keeping the copies in each cache in step. Data ownership bypasses this problem, because only one PE can own a location. The operation of the cache memory together with the shared main memory is otherwise conventional and will not be described in detail.

Data ownership ensures that a task cannot access any location currently owned by another task (except under some special circumstances described later). This ensures that if two tasks interact by sharing any data, then the effect is exactly as though one of the tasks had committed before the other started. An attempt by a task T2 to access a location owned by a first task T1 causes a collision, which must he resolved before the tasks can proceed.

A collision may be resolved in various ways. The simplest way to resolve a collision is to cancel and rollback the second task, T2, and restart T2 later. Usually, T2 is not restarted until task T1 committed, otherwise the same collision will probably happen again, but this is a matter of efficiency, not a requirement for correctness. Another way to resolve a collision is to cancel and rollback T1, and let T2 continue as if T1 had never run. The ownership mechanism keeps rollback data, which is a copy of the original content of any location written by a task. As soon as it is decided that T1 is to be rolled back, T2 can be given the rollback data and can continue. The remaining operations needed to complete the rollback of T1 can continue in parallel.

Preferably, these two ways are combined in the MPA according to the invention. When a collision occurs, T2 is allowed to read the rollback data, and is immediately interrupted. At this point both tasks T1 and T2 have been allowed to read the data, and only one of these reads can be valid. The OS must then use task priorities or other information to decide which task should continue; the other task must be rolled back.

In principle, a collision need not require that one of the tasks be rolled back. It is logically possible for T2 to simply wait until T1 commits, after which T2 can read the updated value of the location and continue.

In the above described Exclusive Access implementation, a task exerts ownership over a memory location upon either a read or a write access to that location. In the second implementation of the invention, a different data ownership mechanism is employed, called Shared Read ownership. This would preferably be used in combination with the Exclusive Access data ownership mechanisms described previously for a certain subset of the shared memory. Selected locations can be defined to be Shared Read locations and to be managed by this mechanism. Shared Read Ownership always enforces logically correct behaviour whatever pattern of read and write access is encountered, but is optimized for the case where a location is read by many tasks and modified only rarely. So long as a Shared Read location is not modified, many tasks can read the location and proceed in parallel. For certain classes of data, such as pointers to data structures this greatly reduces the number of collisions which would otherwise force tasks to rollback. On the other hand, write access to the set of Shared Read locations is strictly limited, and is granted to only one task at a time. Consequently, Shared Read Ownership should be restricted to those locations where only a small minority of tasks need write access; otherwise too many tasks will need to write to Shared Read locations and will be unable to run in parallel.

The decision to define a location as a Shared Read location is made as a part of the software design process, after study of likely access patterns and intended use.

Every memory location is preferably marked as either Standard or Shared Read under software control when a data structure is initialized, and is not normally changed at other times.

Tasks may read a shared read location without seizing ownership and without being blocked or rolled back. When one or more Shared Read locations must be modified, a writer task seizes ownership of the locations concerned, and other tasks seeking access may then be delayed or blocked.

For clarity of description, a task which is allowed to modify Shared Read locations will be called an Update task.

The OS can designate any task as an update task, either when the task is launched or later when the task first attempts to write to a Shared Read location. If a task attempts to write to a Shared Read location, but cannot meet the necessary conditions to become an update task, the OS will force the task to rollback.

Figure 10A:
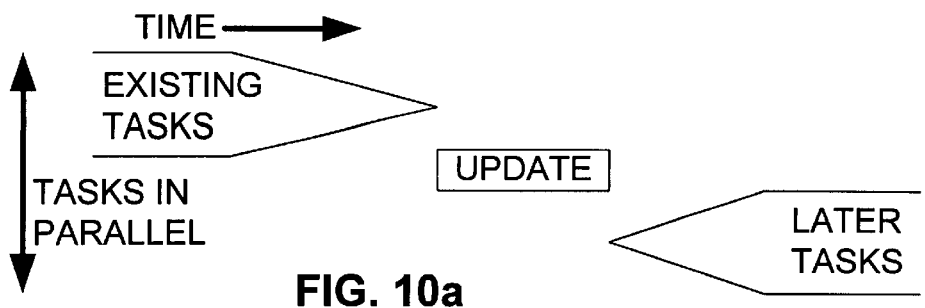
FIGS. 10a–10d are timing diagrams for the timing of update tasks for Shared Read implementations.

During normal system operation, many tasks may read an item of shared read data. Before that item can be safely changed, all these reader tasks must commit or be rolled back. It is not simple to keep records of all tasks which read the data, without incurring a significant time or a space overhead. A simpler solution is to assume that any active task may have read the data. When an update is required, existing tasks are allowed to continue until they commit, or are rolled back, while no new tasks are started. When no active tasks remain, the update task is run alone. After the update task has committed, normal operation is resumed. This solution can be represented as shown in FIG. 10a.

As described, this solution is not attractive, because there is an extended period during which fewer tasks than normal can run. However, the solution can he refined into a more desirable one as described below.

In the improved solution, the update task is allowed to run in parallel with other tasks, but its operation is concealed from the rest of the system. Other tasks can continue to run, and more tasks can be started, but any task attempting to read a Shared Read location owned by the update task is given a copy of the original or rollback data. This means that the update task operation has no detectable effect on the other tasks, which are referred to as "early tasks". At some later time, possibly not until all the update task processing is finished, the number of early tasks is reduced to zero by not allowing any more early tasks to start. When no early tasks remain, the update task is committed, and new tasks called "later tasks" can start.

Figure 10B:
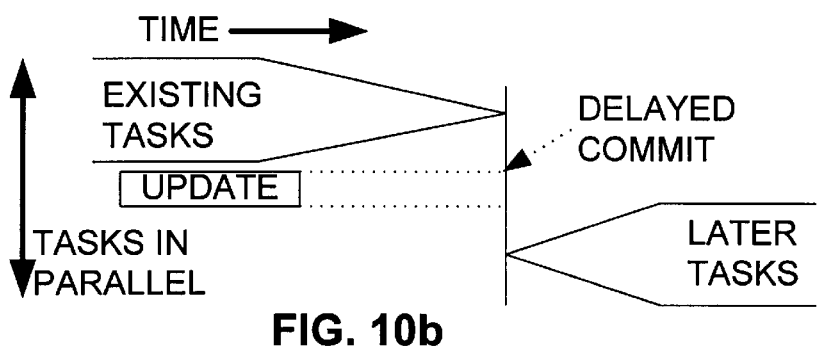

This improved solution is shown in FIG. 10b. The update task runs before all the early tasks have finished, but does not commit until all these tasks have committed or rolled back. The early tasks may have started before or after the update started, but in any case they logically precede the update, because they cannot access any data modified by the update. All the early tasks must be committed before the update commits. Later tasks start after the update commits, and logically follow the update. The cut off point, after which no more early tasks are started, can occur at any time, but there is little advantage in cutting off early task starts before the update task is ready to commit.

Figure 10C:
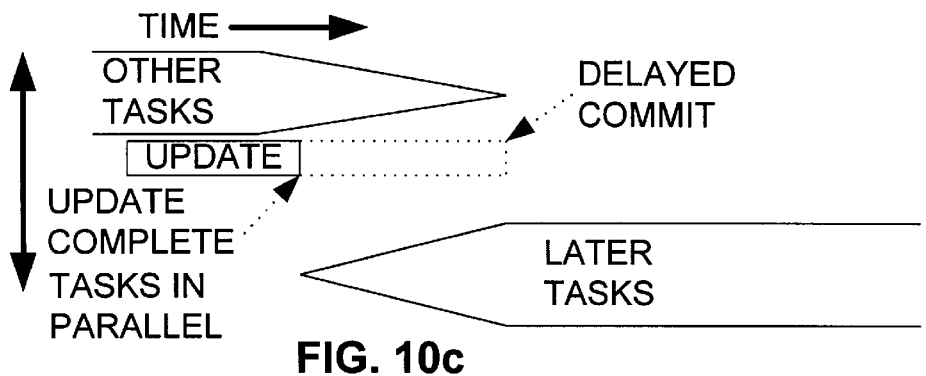

The solution presented above can be improved still further. Once the update task processing is ready to commit it is said to be "complete". The task will not modify any more locations; it already owns every location which it has modified, and it merely waits until all the early tasks have committed or rolled back. This makes it possible to start later tasks as soon as the update is complete, without waiting for it to commit. Of course, later tasks must not read any data modified by the update task before the update task commits, but all such data is already owned by the update task at this point, so it is simple to prevent illegal access. This gives almost complete overlap of early and later tasks, as shown in FIG. 10c.

In summary, the update task divides the universe of tasks into two subsets: the 'early' tasks which logically precede the update, and the 'later' tasks which start after the update is complete.

The early tasks may or may not have read data which is later modified by the update task. In any case, the tasks read the original or rollback copy of the data, so are not affected by the update; the tasks logically precede the update, and proper atomic operation is assured.

The later tasks may or may not attempt to read data which has been modified by the update. If a later task does not read any modified data, it is not affected in any way by the update. It is allowable for such a task to continue, and even to commit without waiting for the update to commit first.

Conversely, if a later task reads data which has been modified by the update, it is necessary that the later task should logically follow the update. In other words, the update must commit before any effected task can commit. This could be implemented in any of three ways:

1. Allow the read to succeed and allow the reader task to continue, but do not allow the reader task to commit until after the update commits.

2. Block the read, and the reader task, until the update commits, then allow the read to succeed and the reader to continue.

3. Block the read, and force the reader task to rollback.

Choices 1 and 2 allow a greater degree of parallel operation, but both options require the OS to maintain lists of blocked tasks, and become complicated if for some reason the update cannot be committed.

Choice 3 forces a rollback which could perhaps have been avoided, but the mechanism is simple and robust. It affects only a minority of tasks, those which attempt to read a Shared Read location shortly after it has been updated.

A task can enter update mode by making a special call to the OS. Alternatively a trap to the OS occurs if a task not in update mode attempts to write to Shared Read data. In either case, if permission is granted the OS sets certain control bits to allow the task to write to Shared Read locations; otherwise the OS will force the task to rollback.

The update task is then said to be in progress until it indicates that it is complete by making another call to the OS. When the update is complete the OS will flush any changed data to memory but will not yet commit the changes; the update task is now in completed mode. The task is still an update task and will be until the task is committed, as discussed below. The OS does not allow any more early tasks to be started and begins to schedule 'later' tasks as described previously. More details of these mechanisms are described later.

It is not permissible for two update tasks to be in progress at the same time unless one of them is subsequently rolled back. If two tasks were allowed to be in progress at the same time and both committed then the results would not necessarily correspond to sequential and atomic operation of the updates. In fact the protocols described previously are sufficient to ensure that this improper operation cannot occur. For if $T_1$ is an update task in progress and $T_2$ is another task running at the same time then $T_2$ is treated as an early task and must commit before $T_1$ can commit. But if $T_2$ is also an update task then by the same argument $T_1$ must commit before $T_2$. Thus the protocol requires that if $T_1$ and $T_2$ are both update tasks in progress then neither can commit unless the other is rolled back.

In practice, overlapping updates may be prevented in a more direct manner. If there is an update task in progress the OS simply does not allow a second task to enter update mode. This avoids the complexities and inefficiency of allowing overlapped operation which would subsequently lead to deadlock and rollback.

Once an update task is complete it must remain in complete but uncommitted mode until all the early tasks have committed or rolled back. Meanwhile SOS can start later tasks and can even allow later tasks to commit provided that they do not read or write any of the data still owned by the complete but uncommitted update.

Figure 10D:
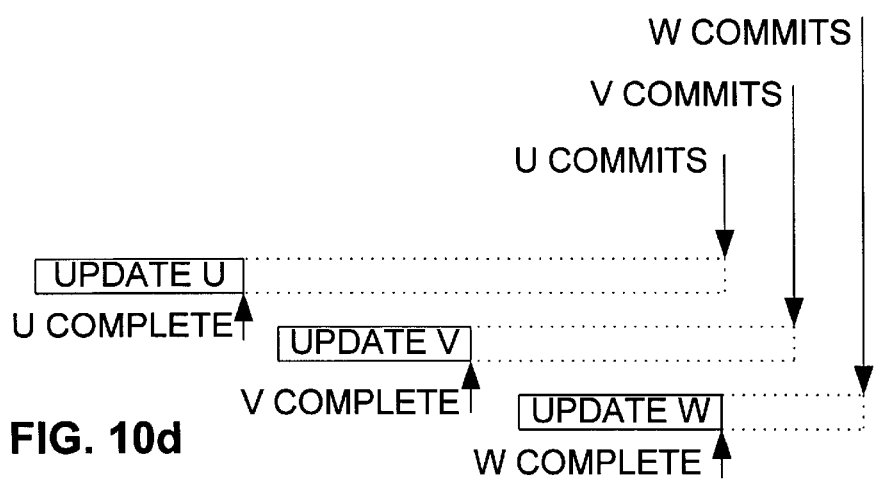

Such later tasks may themselves become update tasks, subject to the limitation of only one update in progress at a time. Thus there may be a whole series of update tasks, U, V, W, and so on, as shown in FIG. 10d.

The protocol described ensures that the update tasks cannot overlap. It also ensures that the update tasks commit in turn, so that the first to operate is the first to commit. This follows, because an update task is not able to commit until all tasks started before it have committed.

Every task is allocated a number called its Generation number, and is said to be a member of that Generation. A global variable called the Current Generation number is maintained by the OS and defines the Current Generation. Every newly started task is a member of the Current Generation. The OS passes this generation number to the SST memory where it is stored in the relevant record. If there are no update tasks, the Current Generation number remains unchanged, and all tasks are members of the Current Generation.

Eventually, some task will become an update task, and it can then write to some Shared Read locations. Only one update task can be in progress at any one time and it will be a member of the Current Generation. In due course the update task will notify the OS that it is complete. At this time, SOS increments the Current Generation number by one. All tasks started subsequently will have the new Generation number. This also applies to any further update tasks which may be started.

The requirements of the update protocols map naturally into the Generation numbers. There is at most one update task in any Generation, because a new update cannot start until the previous update is complete and the Current Generation number is incremented.

If an update task is a member of generation G, then any other task with generation less than or equal to G is an 'early' task; in relation to the update; that is, it started before the update task in generation G was complete. Otherwise it is a 'later' task, which started after the update task in generation G was complete. When a task accesses a location owned by the update task in generation G, the accessing task generation is compared with G. If the accessing task has a generation less than or equal to G it is an early task and is allowed to read the original or rollback data from the location. If the accessing task has a generation greater than G, it is a late task, access is denied, and the accessing task must rollback.

An update task cannot commit until all relatively early tasks have committed. This simply means that the update task in generation G cannot commit while there remain any other tasks with generation G or less than G.

Under normal circumstances, relatively few generations will exist at any one time. Typically, at most two or three new update tasks will start before the first commits. Each completed but uncommitted update task remains to in waiting, occupying a task slot. In the example described, there are at most 256 slots, so this sets an absolute maximum to the number of generations which can exist at the same time, but this grossly exceeds the number of generations actually required.

Generation numbers may be allocated in the range 0 to 511, allowing twice as many numbers as there can be generations. This simplifies the comparison of generation numbers which are allocated cyclically, but has no importance for the logical behaviour of the system.

Figure 11:
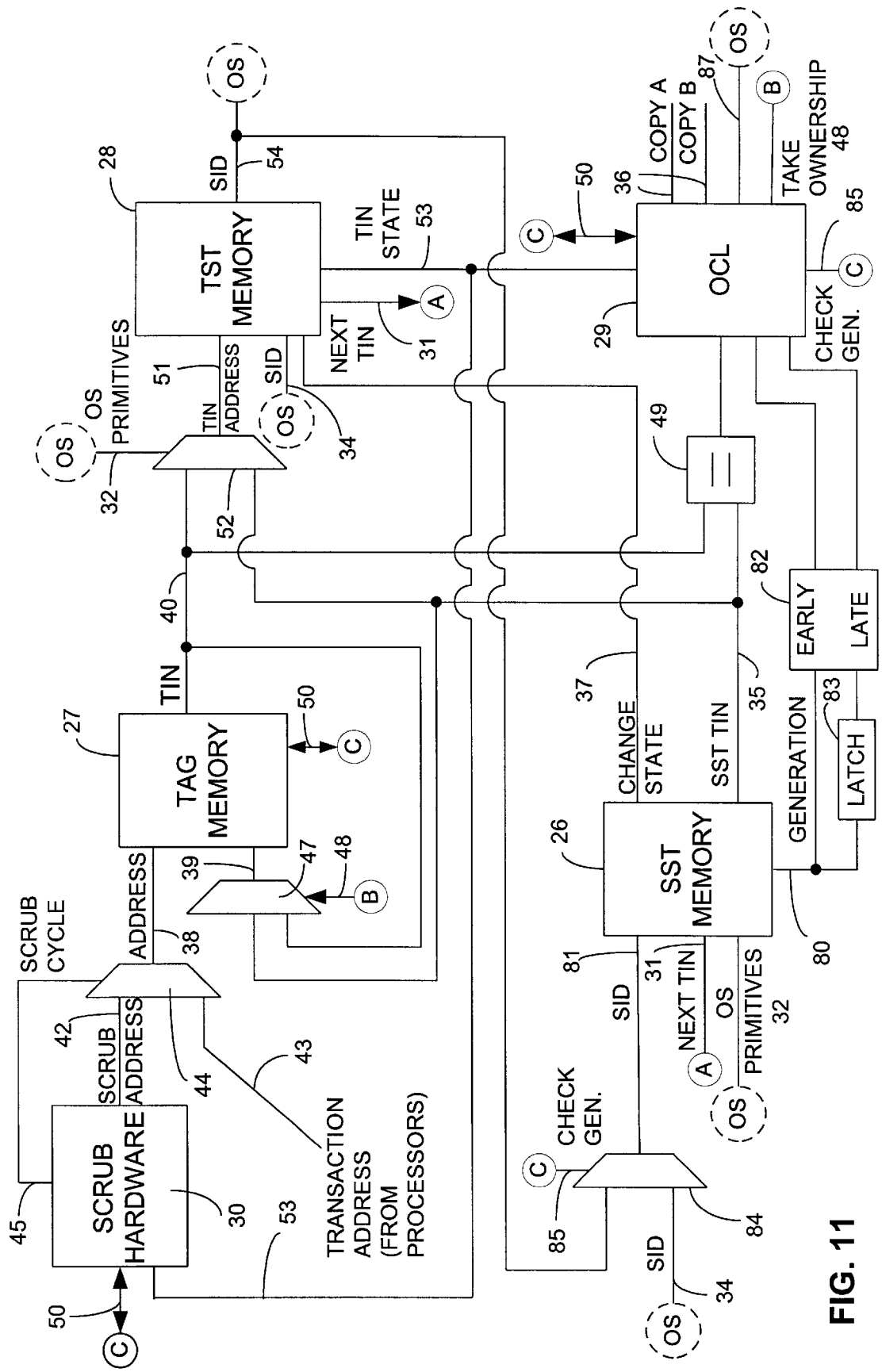
FIG. 11 is a block diagram of the memory ownership control system according to the invention for an implementation allowing both Exclusive Access and Shared Read Access.

Now a practical implementation of the above shared read protocol will be described with reference to FIGS. 11–13. FIG. 11 is a block diagram of the memory ownership control hardware which is very similar to FIG. 2, but which has the additional features required for Shared Read Access.

The record structure for a record in the tag memory 27 is shown in FIG. 12. Two additional fields are required for the Shared Read implementation, these being the mode field, and the switch field. The Mode field is "0" if the line is in "exclusive access" mode, and is "1" if the line is in "shared read" mode. The Switch field is "0" if the line should remain in the same mode if the owner commits, and is "1" if the line's mode should be switched if the owner commits. With the Shared Read implementation, each individual memory location is individually selectable to be in Shared Read mode or Exclusive Access mode, the particular mode being determined by the Mode field.

The record structure for a record in the SST memory 28 is shown in FIG. 13. One additional field, referred to as the Generation field, is required. The Generation field contains the generation number of the task currently assigned to the respective slot.

Referring now to FIG. 11, only the additional features necessary for the Shared Read Access implementation will be described. The SST memory 26 has an additional output consisting of the Generation number 80 for the SID 81 currently being input. This is fed directly into a generation compare block 82, and also through a latch 83 to the generation compare block 82. The SID 81 may come from either the SID 34 from the OS as before, or may be the SID output 54 from the TST memory 28. A multiplexer 84 selects which SID to use on the basis of a check generation signal 85 generated by the OCL 29. It takes the SID 34 unless the check generation signal 85 is true. The OCL has another additional output consisting of a status signal 87 which is passed to the OS, as described below.

When an access to a Shared Read location is first attempted, the SID 34 from the OS for the accessing task is used as SID input 81. The SST memory 26 outputs the generation number 80 of the accessing task and this is stored in the latch 83. At the same time, the tag memory 28 is checked to see if the location is owned by an active task. If it is, then the SID of the owning task is looked up in the TST memory and output 54 by the TST memory. This SID 54 is then fed back to the SST together with a "check generation" signal 85 from the OCL 29. The SST memory looks up the generation number of the owning task and outputs this again. The generation numbers of the owning task and of the accessing task (previously latched in latch 83) are compared in the generation compare block 82, and an indication of whether the accessing task is an Early task or a Late task is passed to the OCL. When the mode indicates that the location being accessed is a Shared Read Access location, the Early/Late indication is used together with the Active Copy bit to determine which copy, if any, to return to the accessing task. If the accessing task is Early, then the non Active copy is returned. If the accessing task is Late, then the Active copy is returned and the status signal 87 is output to the OS. When the OS receives the status signal, it knows that it must rollback the accessing task if the relevant update task has not yet completed.

For Shared Read locations, the take ownership command 48 is only issued when a task is granted write access to a location. For Exclusive Access locations, the ownership command 48 is issued for both read and write accesses to a location.

Numerous modifications and variations of the present invention are possible in light of the above teachings. It is therefore to be understood that within the scope of the appended claims, the invention may be practised otherwise than as specifically described herein.

In new systems in which a parallel architecture described above is substituted for a central processing architecture, instruction level compatibility between the two architectures may not be required, provided that most of the original software is written in a high level language. However, some parts of the software are directly concerned with the hardware design and architecture, these including hardware abstractions, maintenance routines for central control, and some parts of the I/O system are examples. These parts will typically need to be changed to handle the new parallel processor architecture, but the scale of this task would be minuscule compared with that of modifying all of the software.

The ability to rollback a failed task allows recovery from a large proportion of software failures. If the failure is transient or timing dependent, then the task will often succeed if it is run again. If the failure occurs only under an unusual set of circumstances, the offending call or operation can be deleted with minimal effect on the system as a whole.

In the above described implementations, a particular set of interactions between an operating system environment and a memory control ownership system have been described. It is to be understood that the invention can be easily applied to most operating systems with appropriate modifications.

In the above described implementations, a SID is used to represent globally a task identifier, and a local variable referred to as a TIN is used in each memory module to identify the task at the module level. TINs are not reallocated until all memory locations have been scrubbed. Alternatively, the SIDs could directly be used in each memory module. In this case, SIDs could not be reallocated until the memory locations have been scrubbed, and this would require a larger number of SIDs to be available.

In the above described embodiments, very specific structures have been defined for various memories, for example, the tag memory, the TST memory, and the SST memory. It is to be understood that these specific structures are implementation specific and that many different structures may be used to the achieve the invention.

The embodiments of the invention in which an exclusive property or privilege is claimed are defined as follows:

1. A parallel processing/shared memory system comprising:
   a plurality of processors for running a plurality of tasks each identifiable by a task identifier;
   one or more memory modules each having a plurality of memory locations, each memory location associatable with one of the task identifiers;
   means for allowing or denying a particular task to access a particular memory location on the basis of the task identifier associated with that location and the task identifier of the particular task, and for associating the task identifier of the particular task with the particular memory location when the particular task is allowed access to that location, and for de-associating the task identifier of the particular task with the particular memory location after the particular task is completed or otherwise terminated thereby making the particular memory location and its contents accessible by another task.

2. A system according to claim 1 wherein the memory module has a tag field for each memory location and a data field for each memory location, the tag field including an ownership field for storing ownership information identifying the associated task, the associated task being the owner task for that memory location.

3. A system according to claim 2 wherein the task identifier is unique at a system level.

4. A system according to claim 2 wherein the task identifier is unique at a memory module level.

5. A system according to claim 2 wherein a system task identifier is assigned to each task which is unique at a system level, and wherein a module task identifier is assigned by each memory module for each task which is unique at a memory module level, the module task identifier being stored in the ownership field.

6. A parallel processing/shared memory system comprising:
   a plurality of processors for running a plurality of tasks each identifiable by a task identifier;
   one or more memory modules each having a plurality of memory locations, each memory location associatable with one of the task identifiers;
   means for allowing or denying a particular task to access a particular memory location on the basis of the task identifier associated with that location and the task identifier of the particular task, and for associating the task identifier of the particular task with the particular memory location when the particular task is allowed access to that location;
   wherein the memory module has a tag field for each memory location and a data field for each memory location, the tag field including an ownership field for storing ownership information identifying the associated task, the associated task being the owner task for that memory location; wherein the data field comprises a first copy field and a second copy field, and the tag field further comprises an active copy field identifying one of the copy fields as containing an active copy and identifying the other of the copy fields as containing a rollback copy.

7. A system according to claim 6 wherein a task which is denied access to a particular location may be rolled back by toggling the active copy field of all data locations written to by that task.

8. A system according to claim 7 wherein:
   upon a first read or write by a given task of a given unowned location, ownership information identifying that task is written into the ownership field of the location;
   a first write by a given task to a given location is achieved by changing the active copy field to point to what formerly was the rollback copy, and writing the new data to the newly defined active copy; and
   subsequent writes by the given task to the given location are achieved by writing to the active copy.

9. A system according to claim 7 wherein the tag field further comprises an owned field identifying the respective location as either owned or unowned.

10. A system according to claim 5 wherein:
    each task is identified by a SID (slot identification number) which is unique at the system level;
    each task is assigned a TIN (task identification number) which is unique at the memory module level;
    the ownership information comprises the TIN of the accessing task.

11. A system according to claim 9 wherein the tag field further comprises a dirty field, the system further comprising:

a state table for identifying the state for each TIN as either ACTIVE or COMMIT or ROLLBACK, the ACTIVE state defining a task which is currently running, the COMMIT state defining a task which has finished, and the ROLLBACK state defining a task which is to be rolled back;

wherein:

1) when a new TIN is started, the state in the state table is updated to be ACTIVE;

2) when a TIN is finished, the state in the state table is updated to be COMMIT;

3) when a TIN is to be rolled back, the state in the state table is updated to be ROLLBACK;

4) any task is allowed access to a location which is unowned;

5) when a task having a first TIN attempts to access a location having a second TIN, the state table is consulted for the state of the second TIN; the task is allowed access if the state of the second TIN is COMMIT or ROLLBACK;

6) when a task is first allowed read or write access, its TIN is written into the tag field;

7) when a task is first allowed write access, the dirty field is set.

12. A system according to claim 11 wherein a task is denied access if the state of the second TIN is ACTIVE.

13. A system according to claim 11 wherein a task is permitted access if the state of the second TIN is ACTIVE, and wherein subsequently a priority resolution mechanism selects which one of either that task or the task having the second TIN is to continue, the other task being rolled back.

14. A system according to claim 11 wherein the dirty field, the active copy field and the owned field are corrected if the first TIN is COMMIT or ROLLBACK.

15. A system according to claim 11 wherein the active copy field and the owned field are corrected when accessed by the second task or by a background scrub task if the first TIN is COMMIT or ROLLBACK.

16. A system according to claim 9 wherein: correcting a location with a COMMIT TIN involves changing the owned field to reflect unowned, and clearing the dirty field if set;

correcting a location with a ROLLBACK TIN involves changing the owned field to reflect unowned, and in the case the dirty field is set, changing the active copy field point to the rollback copy and clearing the dirty field.

17. A parallel processing/shared memory system comprising:

a plurality of processors for running a plurality of tasks each identifiable by a task identifier:

one or more memory modules each having a plurality of memory locations, each memory location associatable with one of the task identifiers;

means for allowing or denying a particular task to access a particular memory location on the basis of the task identifier associated with that location and the task identifier of the particular task, and for associating the task identifier of the particular task with the particular memory location when the particular task is allowed access to that location;

wherein the memory locations include standard locations and shared read locations.

18. A system according to claim 17 wherein any task is allowed read access to a shared read location, but only a single task is allowed write access to a shared read location.

19. A system according to claim 18 wherein a task which is allowed write access to a shared read location owns that location and becomes an update task;

tasks which do not access the shared read locations are allowed to continue normally;

tasks which access the shared read locations before the update task completes must commit before the update task;

tasks which access the shared read locations after the update task completes must commit after the update task.

20. A system according to claim 19 wherein a global variable tracks a generation number, and each task is assigned the generation number, and the generation number is incremented each time an update task starts, and thereby allowing only a single update task of a given generation task to exist.

21. A system according to claim 1 wherein the data field comprises a first copy field and a second copy field and the tag field further comprises an active copy field identifying one of the copy fields as containing an active copy and identifying the other of the copy fields as containing a rollback copy.

22. A system according to claim 6 wherein:

upon a first read or write by a given task of a given unowned location, ownership information identifying that task is written into the ownership field of the location;

a first write by a given task to a given location is achieved by changing the active copy field to point to what formerly was the rollback copy, and writing the new data to the newly defined active copy; and subsequent writes by the given task to the given location are achieved by writing to the active copy.

23. A system according to claim 6 wherein the tag field further comprises an owned field identifying the respective location as either owned or unowned.

* * * * *